United States Patent
Jiang et al.

(10) Patent No.: US 11,432,160 B2
(45) Date of Patent: Aug. 30, 2022

(54) METHOD AND APPARATUS FOR PERFORMING TRANSMISSION

(71) Applicant: NEC CORPORATION, Tokyo (JP)

(72) Inventors: Lei Jiang, Beijing (CN); Hongmei Liu, Beijing (CN); Chuangxin Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/319,211

(22) PCT Filed: Jul. 31, 2015

(86) PCT No.: PCT/CN2015/085798
§ 371 (c)(1),
(2) Date: Dec. 15, 2016

(87) PCT Pub. No.: WO2017/020200
PCT Pub. Date: Feb. 9, 2017

(65) Prior Publication Data
US 2017/0257775 A1    Sep. 7, 2017

(51) Int. Cl.
*H04W 16/14* (2009.01)
*H04W 72/04* (2009.01)
(Continued)

(52) U.S. Cl.
CPC ......... *H04W 16/14* (2013.01); *H04W 72/042* (2013.01); *H04W 72/1268* (2013.01);
(Continued)

(58) Field of Classification Search
CPC ............... H04W 16/14; H04W 72/042; H04W 72/0453; H04W 72/0446
See application file for complete search history.

(56) References Cited

U.S. PATENT DOCUMENTS 9,723,626 B2 * 8/2017 Golitschek Edler Von Elbwart ............ H04W 72/1289
9,787,443 B2 * 10/2017 Damnjanovic ....... H04L 5/0007
(Continued)

FOREIGN PATENT DOCUMENTS

CN         103299574 A    9/2013
CN         103580840 A    2/2014
(Continued)

OTHER PUBLICATIONS

3GPP TR 36.889 V13.0.0, 3$^{rd}$ Generation Partnership Project; Technical Specification Group Radio Access Network; Study on Licensed-Assisted Access to Unlicensed Spectrum; (Release 13); Jun. 30, 2015.
(Continued)

*Primary Examiner* — Jaime M Holliday
(74) *Attorney, Agent, or Firm* — Sughrue Mion, PLLC

(57) ABSTRACT

Embodiments of the present disclosure provide a method of performing transmission between a base station and a terminal device according to a frame structure over an unlicensed spectrum in a wireless network that supports communications over both a licensed spectrum and the unlicensed spectrum. The method comprises signaling information indicating the frame structure and performing transmission between the base station and the terminal device on an unlicensed carrier in the unlicensed spectrum according to the frame structure. There is also provided the corresponding apparatus.

10 Claims, 6 Drawing Sheets

(51) Int. Cl.
*H04W 72/12* (2009.01)
*H04W 72/14* (2009.01)
*H04W 74/00* (2009.01)
*H04W 74/08* (2009.01)
*H04W 28/26* (2009.01)

(52) U.S. Cl.
CPC ............ *H04W 72/14* (2013.01); *H04W 28/26* (2013.01); *H04W 74/002* (2013.01); *H04W 74/0808* (2013.01)

(56) References Cited

U.S. PATENT DOCUMENTS

| | | | |
|---|---|---|---|
| 2014/0003387 A1* | 1/2014 | Lee | H04L 5/001 370/330 |
| 2014/0029486 A1* | 1/2014 | Li | H04L 5/1469 370/280 |
| 2014/0112289 A1 | 4/2014 | Kim et al. | |
| 2014/0204807 A1* | 7/2014 | Li | H04L 1/1671 370/277 |
| 2014/0341018 A1 | 11/2014 | Bhushan et al. | |
| 2015/0049741 A1 | 2/2015 | Chen et al. | |
| 2015/0055522 A1* | 2/2015 | Fu | H04L 5/0007 370/280 |
| 2015/0201431 A1 | 7/2015 | Um et al. | |
| 2015/0245323 A1* | 8/2015 | You | H04W 72/042 370/329 |
| 2016/0226637 A1* | 8/2016 | Nory | H04L 5/0053 |
| 2016/0227536 A1* | 8/2016 | Khawer | H04W 72/0453 |
| 2016/0302230 A1* | 10/2016 | Novlan | H04B 17/318 |
| 2017/0111913 A1* | 4/2017 | Li | H04W 72/0453 |
| 2017/0202019 A1* | 7/2017 | You | H04W 16/14 |
| 2017/0238190 A1* | 8/2017 | Yang | H04L 5/0048 370/329 |
| 2018/0092128 A1* | 3/2018 | Um | H04W 16/14 |
| 2018/0175975 A1* | 6/2018 | Um | H04W 16/14 |

FOREIGN PATENT DOCUMENTS

| | | |
|---|---|---|
| CN | 104380780 A | 2/2015 |
| CN | 104581908 A | 4/2015 |
| CN | 104660528 A | 5/2015 |
| CN | 104780545 A | 7/2015 |
| WO | 2015/044513 A1 | 4/2015 |
| WO | 2015/048216 A1 | 4/2015 |
| WO | 2015/050772 A1 | 4/2015 |
| WO | 2015/094914 A1 | 6/2015 |

OTHER PUBLICATIONS

International Search Report of PCT/CN2015/085798 dated May 6, 2016.
Communication dated Mar. 14, 2018, from European Patent Office in counterpart application No. 15894515.4.
Communication dated Mar. 15, 2018, from Korean Intellectual Property Office in counterpart application No. 10-2017-7002809.
Communication dated Nov. 27, 2018, from Korean Intellectual Property Office in counterpart application No. 10-2017-7002809.
Notification of Reasons for Refusal dated Jul. 10, 2018 from the Japanese Patent Office in counterpart application No. 2017-514660.
Notification of Reasons for Refusal dated Feb. 27, 2018 from the Japanese Patent Office in counterpart application No. 2017-514660.
Communication dated Jun. 26, 2019, from the State Intellectual Property Office in counterpart Chinese Application No. 201580043867.8.
Communication dated Aug. 14, 2019 from the Intellectual Property Office of India in counterpart application No. 201617042582.
Communication dated Mar. 6, 2019, from the European Patent Office in counterpart European Application No. 15894515.4.
Communication of Decision of Refusal dated Apr. 16, 2019, from the Japanese Patent Office in counterpart application No. 2017-514660.
Communication of Decision of Dismissal of Amendment dated Apr. 16, 2019, from the Japanese Patent Office in counterpart application No. 2017-514660.
MediaTek Inc., "Design Considerations on LAA design", 3GPP TSG RAN WG1 Meeting #80, R1-150575, pp. 1-6 (7 pages total), Athens, Greece, Feb. 9-13, 2015.
Ericsson, "Further Details on LBT Design in DL for LAA", 3GPP TSG RAN WG1 Ad-hoc Meeting, R1-151131, 8 pages total, Paris, France, Mar. 24-26, 2015.
Communication dated Mar. 4, 2020 from the European Patent Office in application No. 15894515.4.
Office Action dated Oct. 6, 2020 in Japanese Application No. 2019-129937.
Office Action dated Feb. 27, 2018 in Japanese Application No. 2017-514660.
Office Action dated Apr. 16, 2020 in Chinese Application No. 201580043867.8.
Huawei et al., "Frame Structure for LAA DL and UL transmission operation", 3GPP TSG RAN WG1 Meeting #81, Fukuoka, Japan, May 25-29, 2015, R1-152470 (5 pages total).
MediaTek Inc., "LAA frame structure design", 3GPP TSG RAN WG1 meeting #81, R1-153254, Fukuoka, Japan, May 25 to May 29, 2015 (9 pages total).

* cited by examiner

METHOD AND APPARATUS FOR PERFORMING TRANSMISSION

TECHNICAL FIELD

The non-limiting and exemplary embodiments of the present disclosure generally relate to wireless communications, and specifically to a method and an apparatus for performing transmission according to a frame structure over an unlicensed spectrum in a wireless network that supports communications over both a licensed spectrum and the unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

The fast uptake of the Third Generation Partnership Project (3GPP)-Long Term Evolution (LTE) in different regions of the world shows the increasing demand for wireless broadband data. In order to meet the ever increasing data traffic demand from users, particularly in concentrated high traffic buildings or hot spots, more mobile broadband bandwidth will be needed. Given a large amount of spectrum available in unlicensed bands around the globe, the unlicensed spectrum is more and more considered by cellular operators as complementary means to augment their service offering. While the unlicensed spectrum may not match the qualities of the licensed regime, solutions that allow an efficient use of it as a complement to licensed deployments have a potential to bring a great value to mobile operators, and ultimately to the mobile industry as a whole. This type of solutions would enable operators and vendors to leverage the existing or planned investments in LTE/Evolved Package Core (EPC) hardware in radio and core networks.

It has been agreed to study Licensed-Assisted Access (LAA) technologies in the 3GPP at RP-141664. This LAA framework builds on carrier aggregation solutions introduced in LTE Release-10 to access additional bandwidth in the unlicensed spectrum and thus supports coexistence of different radio technologies, such as LTE and Wi-Fi. FIG. 1 shows an illustrative network that configures a user equipment, UE, to aggregate a secondary cell (SCell) which is using an unlicensed carrier in the unlicensed spectrum. The primary cell (PCell) may maintain exchange of essential control messages and offer real-time and high-value traffic over the licensed spectrum. Via the robust licensed spectrum, the PCell may also provide mobility handling and management for the UE. The aggregated SCells in the unlicensed spectrum, when available, can be utilized as a bandwidth booster to serve the best effort traffic. The LAA SCells may operate in downlink (DL) or uplink (UL) or both.

However, due to the uncertainty of resource availability on unlicensed carriers, direct application of the existing frame structure in LTE systems to LAA systems may cause some problems, e.g. unexpected resource waste or transmission delay etc. Although some solutions to the frame structure applicable to LAA systems have been proposed, there is no a method to indicate such frame structure between communicating parties, e.g. from a base station to a terminal device or vice versa so that DL and/or UL transmission can be performed between the base station and the terminal device over the unlicensed spectrum according to that frame structure.

SUMMARY

Various embodiments of the present disclosure mainly aim at providing a solution for indicating a frame structure applicable to wireless networks that support communications over licensed and unlicensed spectrums so that transmission can be performed between a base station and a terminal device over the unlicensed spectrum according to the frame structure. Other features and advantages of embodiments of the present disclosure will also be understood from the following description of specific embodiments when read in conjunction with the accompanying drawings, which illustrate the principles of embodiments of the present disclosure.

In a first aspect of the present disclosure, there is provided a method of performing transmission between a base station and a terminal device according to a frame structure over an unlicensed spectrum in a wireless network that supports communications over both a licensed spectrum and the unlicensed spectrum. The method comprises signaling information indicating the frame structure and performing transmission between the base station and the terminal device on an unlicensed carrier in the unlicensed spectrum according to the frame structure. The method may be performed at the base station or alternatively performed at the terminal device.

In a second aspect of the present disclosure, there is provided an apparatus of performing transmission between a base station and a terminal device according to a frame structure over an unlicensed spectrum in a wireless network that supports communications over both a licensed spectrum and the unlicensed spectrum. The apparatus comprises a signaling unit that is configured to signal information indicating the frame structure and a transmission performing unit that is configured to perform transmission between the base station and the terminal device on an unlicensed carrier in the unlicensed spectrum according to the frame structure. The apparatus may be embodied at or as at least part of the base station. The apparatus may alternatively be embodied at or as at least part of the terminal device.

In a third aspect of the present disclosure, there is provided an apparatus for performing transmission between a base station and a terminal device according to a frame structure over an unlicensed spectrum in a wireless network that supports communications over both a licensed spectrum and the unlicensed spectrum. The apparatus comprises a processor and a memory, said memory containing instructions executable by said processor, whereby said apparatus is operative to perform the method according to the first aspect of the present disclosure. The apparatus may be embodied at or as at least part of the base station. The apparatus may alternatively be embodied at or as at least part of the terminal device.

BRIEF DESCRIPTION OF THE DRAWINGS

The above and other aspects, features, and benefits of various embodiments of the present disclosure will become more fully apparent from the following detailed description with reference to the accompanying drawings, in which.

Like reference numbers and designations in the various drawings indicate like elements.

DETAILED DESCRIPTION

Figure 1:
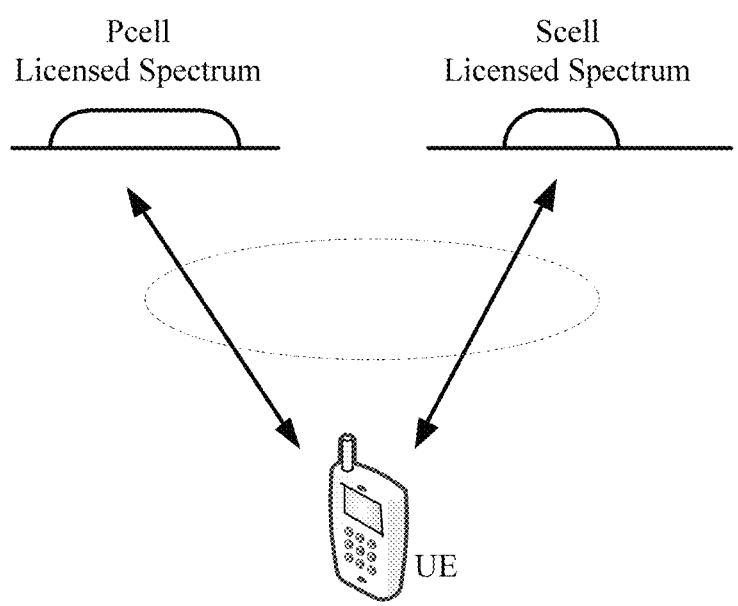
FIG. 1 shows an illustrative network that configures a UE to aggregate a secondary cell which is using an unlicensed carrier in an unlicensed spectrum.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may also be referred to as e.g. eNB, eNodeB, NodeB or base transceiver station (BTS), Access Node (AN) or Access Point (AP) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. In this document, the terms "terminal device" and "UE" will be used interchangeably.

Embodiments of the present disclosure will be applicable to any wireless network that supports communications over both a licensed spectrum and an unlicensed spectrum, including but not limited to an LAA network. In order to simplify the following description, the LAA network will be used as an illustrative example of the wireless network that supports communications over both a licensed spectrum and an unlicensed spectrum, which however will not constitute a limitation to the present disclosure.

In general, transmission performed over the unlicensed spectrum according to a frame structure applicable to LAA networks may comprise at least one of DL transmission and UL transmission. In other words, frame structures applicable to LAA networks may be divided three classes: 1) DL-only: the frame structure supporting DL transmission only, 2) DL+UL: the frame structure supporting both DL and UL transmission, and 3) UL-only: the frame structure supporting UL transmission only. The DL transmission may include transmission of DL control information (which will be referred to as DL control transmission hereafter), e.g. PDCCH (Physical Downlink Control Channel) and DL data transmission, e.g. PDSCH (Physical Downlink Shared Channel). Likewise, the UL transmission may include transmission of UL control information (which will be referred to as UL control transmission hereafter), e.g. PUCCH (Physical Uplink Control Channel) and/or UL data transmission, e.g. PUSCH (Physical Uplink Shared Channel). It shall be appreciated that the use of term "only" herein does not mean there is no other transmission in DL or UL. For example, there may be initial signal transmission (which will be described later) in DL or UL. However, such signal transmission in DL or UL will not be regarded as belonging to the DL transmission or UL transmission in this document.

Due to the sharing property of the unlicensed spectrum, there is a possibility that a same transmission resource will be used simultaneously by multiple stations, including a base station and a terminal device, and thus a collision may occur. In order to avoid such a collision, in the existing wireless networks operating in the unlicensed spectrum, e.g. a Wireless Local Area Network (WLAN) using Wi-Fi technology, a Carrier Sense Multiple Access (CSMA) scheme, which is also referred to as "listen before talk" (LBT), is used to mediate the access to a transmission resource. All stations, including a base station and a terminal device, are allowed to access the resource but are required to make sure the resource is not in use by other stations before transmitting.

Likewise, in an LAA network, no matter a base station or a terminal device needs to make sure, before transmitting, that the resource to be accessed on an unlicensed carrier in the unlicensed spectrum is not in use by other base stations or terminal devices. For example, when the base station or the terminal device has a packet to transmit on an unlicensed carrier, it may make a clear channel assessment (CCA) check by performing LBT to obtain an exclusive occupation on the unlicensed carrier. Since either DL transmission or UL transmission needs to start at a certain position, e.g. a boundary of a predefined symbol or a boundary of a subframe, there usually is a time period after the LBT succeeds and before the DL or UL transmission is actually performed. During this time period, a signal may be transmitted on the unlicensed carrier. A main objective of transmission of this signal is to guarantee that resources on the unlicensed carrier will not be taken by other users during this period. Additionally, the transmitted signal may also comprise some information for assisting or facilitating transmission on the unlicensed carrier or for other purposes. In this document, this signal will be referred to as an initial signal and this time period will be referred to as a reservation period. However, it shall be appreciated that other terms may also be used to name said signal and time period and that any specific terms for naming the signal and time period will not constitute a limitation to that signal and time period themselves. Moreover, the resource on the unlicensed carrier may also be reserved through other approaches, but not limited to transmitting the initial signal.

Figure 2:
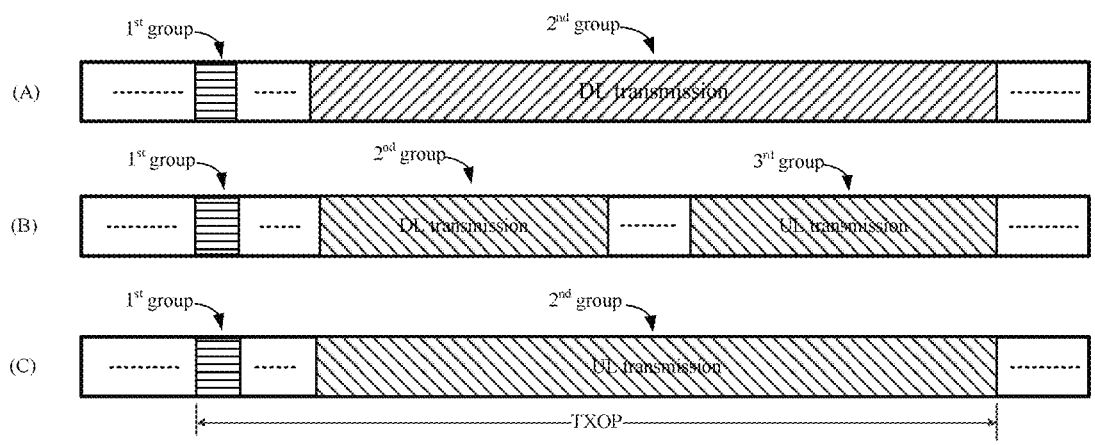
FIG. 2 illustrates three conceptual frame structures corresponding to three transmission cases.

For better understanding of the present disclosure, three conceptual frame structures corresponding respectively to the above mentioned three classes of frame structures are illustrated in FIG. 2.

FIG. 2(A) corresponds to the DL-only class. As illustrated, the frame structure of FIG. 2(A) comprises a first group of time resources corresponding to the reservation period and a second group of time resources for DL transmission within an allowed maximum transmission time period, which may also be referred to as a transmission opportunity (TXOP). The allowed maximum transmission time period refers to a time period during which no CCA needs to be performed. A person skilled in the art shall understand that the specific term TXOP for representing the allowed maximum transmission time period will not constitute a limitation to the meaning of that allowed maximum transmission time period.

FIG. 2(B) corresponds to the DL+UL class. The frame structure of FIG. 2(B) comprises a first group of time resources corresponding to the reservation period, a second group of time resources used for DL transmission and a third group of time resources for UL transmission within a TXOP.

FIG. 2(C) corresponds to the UL-only class. The frame structure of FIG. 2(C) comprises a first group of time resources corresponding to the reservation period and a second group of time resources for UL transmission within a TXOP.

It shall be appreciated that these three frame structures are shown herein only for illustrating some general features of the subframe structure so as to facilitate the following description of the present disclosure. Therefore, any specific feature illustrated in this figure, such as the specific order in which various time resources are shown and the illustrated durations of various time resources, does not constitute a limitation to the present disclosure. Also, the dotted lines used this figure means other time resources may or may not exist therein and no particular limitation is made thereto. A person skilled in the art shall understand that the first, second or third time resources may correspond to one or more subframes or symbols or other resource units, however which one or more subframe(s) or symbols or other resource units correspond to the respective time resources do not constitute limitations to the present disclosure. Therefore, in this figure, details of subframes or symbols are not illustrated.

Figure 3:
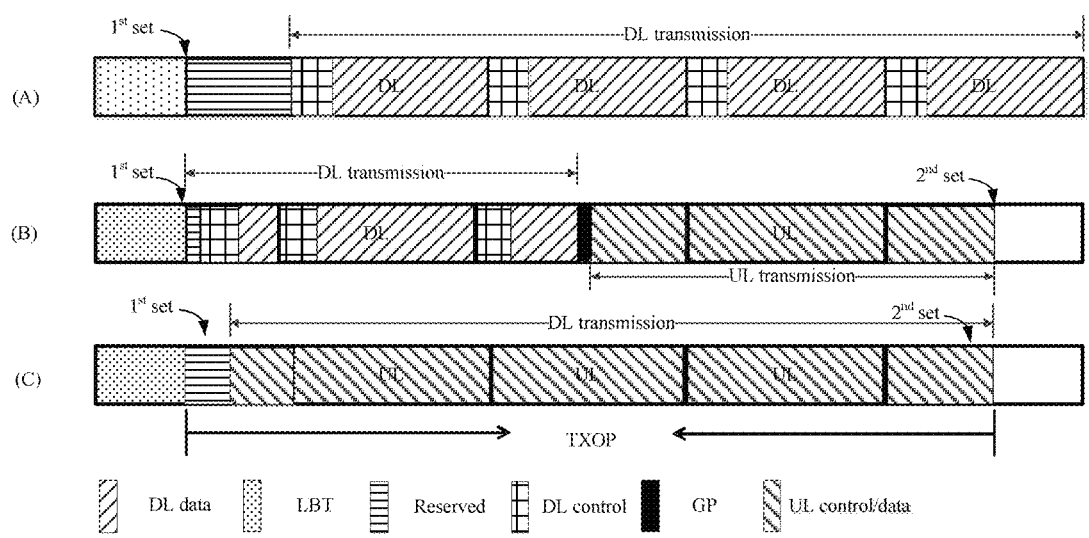
FIG. 3 illustrates three specific examples corresponding respectively to the three frame structures in FIG. 2.

FIG. 3 illustrates three specific examples corresponding respectively to the three frame structures in FIG. 2.

Particularly, FIG. 3(A) shows a specific example of the frame structure of FIG. 2(A). In this example, the frame structure comprises a first set of time resources and four DL subframes in which DL transmission is performed. A subset of the first set of time resources shown with a horizontally shaded block corresponds to the first group of time resources of FIG. 2(A), while the four DL subframes correspond to the second group of time resources of FIG. 2(A). According to this frame structure, availability of an unlicensed carrier is first determined within the part shown with a dotted block during the first set of time resources by using the LBT scheme. Then the subset of the first set of time resources is reserved till the end of the first set of time resources. Upon a duration of the reserved subset of times resource expires, DL transmission, including DL control transmission and DL data transmission, is performed in the four consecutive DL subframes.

FIG. 3(B) shows a specific example of the frame structure of FIG. 2(B). In this example, the frame structure comprises a first set of time resources, one DL subframe in which DL transmission is performed, a subframe comprising a guard period (GP), one UL subframe in which UL transmission is performed and a second set of timer resources. A subset of the first set of time resources shown with a horizontally shaded block corresponds to the first group of time resources of FIG. 2(B). A sum of the partial resources after the subset in the first set of time resources, the DL subframe, and the partial resources before the GP in the subframe comprising that GP corresponds to the second group of time resources of FIG. 2(B). A sum of the partial resources after the GP in the subframe comprising that GP, the UL subframe and the first half of the second set of time resources correspond to the third group of time resources of FIG. 2(B). According to this frame structure, availability of an unlicensed carrier is first performed within the part shown with a dotted block during the first set of time resources. Then the subset of the first set of time resources is reserved till a start of a certain symbol in the first set of time resources, as shown with a horizontally shaded block. Upon the duration of the reserved subset of times resource expires, DL transmission, including DL control transmission and DL data transmission, is performed until the GP is encountered. Afterwards, upon the duration of the GP expires, UL transmission is performed till the end of TXOP.

FIG. 3(C) shows a specific example of the frame structure of FIG. 2(C). In this example, the frame structure comprises a first set of time resources, three UL subframes in which UL transmission is performed and a second set of time resources. A subset of the first set of time resources shown with a horizontally shaded block corresponds to the first group of time resources of FIG. 2(C). A sum of the partial resources after the subset in the first set of time resources, the UL subframes, the partial resources before the GP in the subframe comprising that GP and the first half of the second set of time resources correspond to the second group of time resources of FIG. 2(C). According to this frame structure, availability of an unlicensed carrier is first determined within the part shown with a dotted block during the first set of time resources by using the LBT scheme. Then the subset of the first set of time resources is reserved till a start of a certain symbol in the first set of time resources, as shown with a horizontally shaded block. Upon the duration of the reserved subset of times resource expires, UL transmission, including UL control transmission and/or UL data transmission, is performed till the end of TXOP.

It shall be appreciated that the numbers of DL or UL subframes and the subframe comprising GP in FIG. 3 are illustrated only for the purpose of illustration rather than limiting. Those skilled in the art shall understand that these numbers may be changed according to requirements in actual applications.

Hereafter, various embodiments of the present disclosure will be described with reference to FIGS. 4-7.

Figure 4:
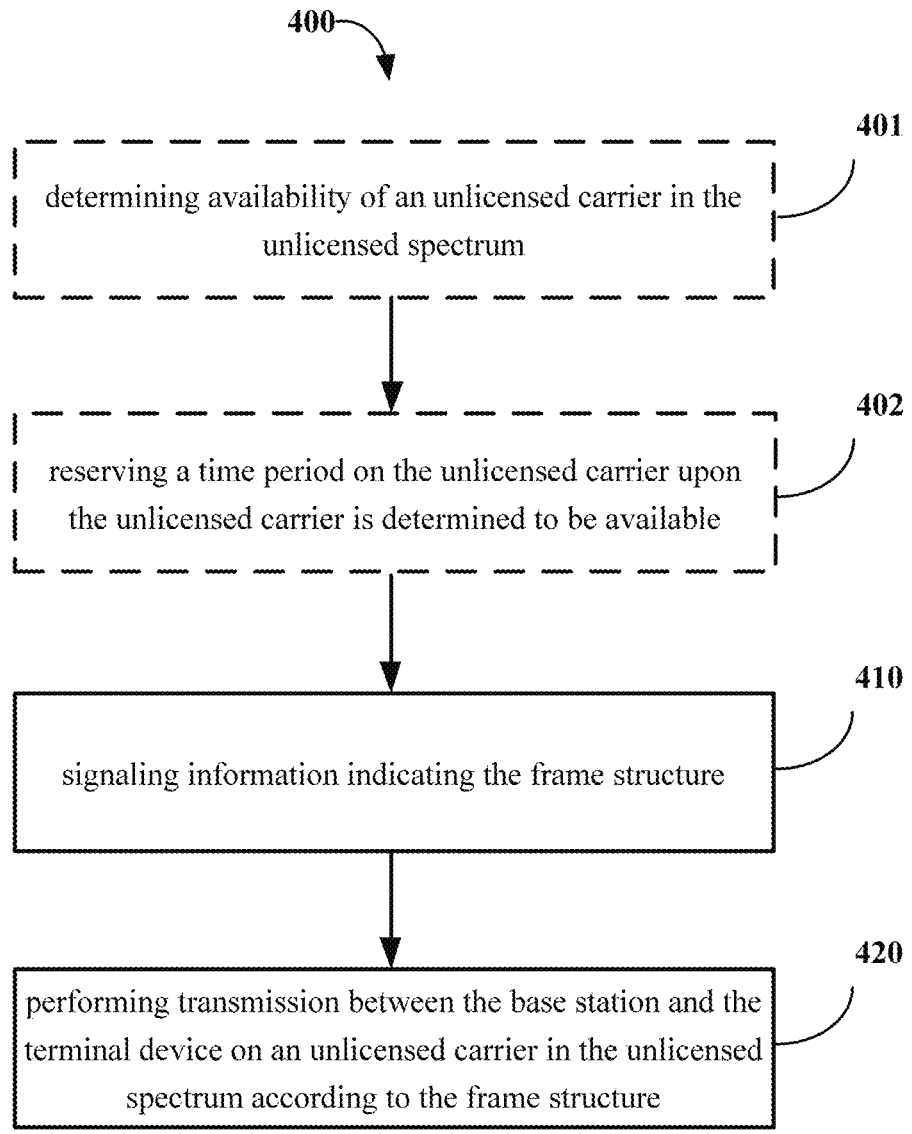
FIG. 4 illustrates a flowchart of a method for performing transmission according to a frame structure over an unlicensed spectrum according to embodiments of the present disclosure.

FIG. 4 illustrates a flowchart of a method 400 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum. The transmission may comprise DL transmission and/or UL transmission. The method 400 may be performed at the base station or at the terminal device.

In FIG. 4, operations in blocks with a solid line are essential while operations in blocks with a broken line are optional depending on various implementations of the present disclosure. The description will be started from the essential operation in block 410.

Particularly, the method 400 starts at step 410, in which information indicating the frame structure is signalled. Then, according to the frame structure, transmission is performed between the base station and the terminal device on an unlicensed carrier in the unlicensed spectrum. In an embodiment, the information indicating the frame structure (which will be referred to as "indicating information" hereafter) may be signaled on a licensed carrier in the licensed spectrum. In another embodiment, the indicating information may be signaled on the unlicensed carrier.

It is clear that an ultimate goal of indicating the frame structure used over the unlicensed spectrum is to enable transmission to be performed on an unlicensed carrier in the unlicensed spectrum according to the frame structure. Therefore, information regarding the frame structure which is necessary for enabling the transmission on the unlicensed carrier shall be known to both communicating parties, i.e. the base station and the terminal device. Such necessary information may be directly obtained or indirectly derived from other information. Thus, the necessary information itself and any information from which the necessary information can be derived may be signalled as the indicating information. The signalling of such information will be detailed with regard to three cases in the following: 1) a DL-only case where only DL transmission is involved; 2) a DL+UL case wherein both DL and UL transmission are involved; 3) a UL-only case where only UL transmission is involved.

For DL-Only Case

In order to achieve the ultimate goal of enabling the transmission, i.e. DL transmission to be performed on the unlicensed carrier, any one or more pieces of information from which, alone or in combination, the necessary information for enabling the DL transmission on the unlicensed carrier can be derived may be indicated to the terminal device as the indicting information.

In an embodiment, the indicating information may comprise any or any combination of information in a group of:
information on a start of DL transmission,
information on an end of the DL transmission,
information on a duration of a TXOP,
information on the duration of the DL transmission, and
information regarding the unlicensed carrier.

In a further embodiment that the frame structure in FIG. 2(A) is adopted and an initial signal is transmitted in the first group of time resources, the above group may further comprise information on a start of the first group of time resources or on a start of the initial signal.

Since DL transmission is specific to an unlicensed carrier, the unlicensed carrier on which the DL transmission is performed shall be known to the terminal device. Therefore, the unlicensed carrier may be indicated to the terminal device. In an example, the unlicensed carrier may be explicitly indicated by including the information regarding the unlicensed carrier in the indicating information, particularly when the unlicensed carrier on which the indicating information is received is different from the unlicensed carrier on which the DL transmission will be performed. In another example, the unlicensed carrier may be implicitly indicated, particularly when the unlicensed carrier on which the indicating information is received is the same as the unlicensed carrier on which the DL transmission will be performed. In this case, the unlicensed carrier on which the DL transmission will be performed may be implicitly determined as the unlicensed carrier on which the indicating information is received.

In an example, if the initial signal and DL data or control information can be correctly detected, then only the duration of the DL transmission or the duration of TXOP needs to be indicated, from which the receiving terminal device can derive the necessary information for enabling the DL transmission, such as the start and end of the DL transmission, wherein the end of the DL transmission may be rounded down to a nearest symbol or subframe. Therefore, in this example, the indicating information may comprise the information on the duration of the DL transmission or the information on the duration of TXOP.

For another example, if the start of the DL transmission is predefined, then the start of the initial signal and the duration of the DL transmission or TXOP may be indicated, from which the receiving terminal device can derive the necessary information for enabling the DL transmission, such as the start and end of the DL transmission. Therefore, in this example, the indicating information may comprise the information on the start of the initial signal, and the information on the duration of the DL transmission or the information on the duration of TXOP.

In yet another example, the start of the initial signal, the start of the DL transmission and the duration of the DL transmission or TXOP may be indicated, from which the receiving terminal device can derive the necessary information for enabling the DL transmission, such as the start and end of the DL transmission. Therefore, in this example, the indicating information may comprise the information on the start of the initial signal, the information on the start of the DL transmission and the information on the duration of the DL transmission or the information on the duration of TXOP.

In yet another example, the start of the DL transmission and the end of the DL transmission may be directly indicated. Therefore, in this example, the indicating information may comprise the information on the start of the DL transmission and the information on the duration of the DL transmission.

Alternatively, some information that changes slowly or can be predetermined, such as TXOP may be signalled to the terminal device via higher layer signalling instead of being included in the indicating information.

Furthermore, the indicating information may be signalled in a plurality of bits, e.g. by reusing the existing DCI (Downlink Control Information) format 1C as defined in section 5.3.3 in 3GPP Technical Specification 36.212 version 12.4.0. In this case, a new radio network temporary identifier (RNTI) may be required to differentiate the reused DCI format 1C from the existing use of DCI format 1C.

Alternatively, the indicating information may be signalled with a new DCI format comprising a field that may include the indicating information.

Figure 5:
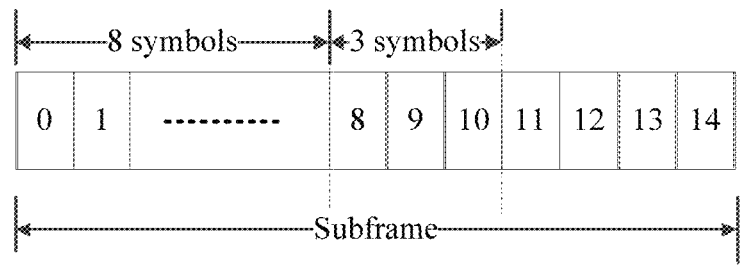
FIG. 5 illustrates an example of how to reduce the number of bits for indicating information on the start of the initial signal according to an embodiment of the present disclosure.

In order to efficiently utilize the limited bandwidth resource, the number of bits used for indicating the frame structure may be reduced as small as possible. FIG. 5 illustrates an example of how to reduce the number of bits for indicating information on the start of the initial signal according to an embodiment of the present disclosure.

In this example, it is predefined that the DL transmission shall start at symbol 11 in a subframe comprising 14 symbols. It shall be appreciated that the DL transmission may start at a different certain symbol and the subframe may comprise less or more symbols. If the initial signal starts at symbol 8, then there are two manners to indicate the start of the initial signal: 1) using an absolute start position of the initial signal, i.e. the $9^{th}$ symbol in this subframe, which may require 4 bits to make the indication, and 2) using a relative start position of the initial signal to the DL transmission that is a difference between the start positions of the initial signal and the DL transmission, i.e. 3 symbols which may require 2 bits to make the indication. Obviously, using the relative start position of the initial signal may reduce the number of the bits for indicating.

As an example, Table 1 lists some bits that may possibly be used for indicating the frame structure alone or in combination, in the reused DCI format 1C, which may provide 15 bits for 20 MHz.

In an embodiment, the indicating information may comprise any or any combination of information in a group of:
    information on the start of DL transmission,
    information on the end of the DL transmission,
    information on the start of UL transmission,
    information on the end of the UL transmission,
    information on the duration of a TXOP,
    information on the duration of the DL transmission,
    information on the duration of the UL transmission, and
    information on a sum of the durations of the DL transmission and UL transmission,
    information regarding the unlicensed carrier.

In a further embodiment that the frame structure in FIG. 2(B) is adopted and an initial signal is transmitted in the first group of time resources, the above group may further comprise information on a start of the first group of time resources or on a start of the initial signal.

Since DL transmission and UL transmission are specific to an unlicensed carrier, the unlicensed carrier on which the DL transmission and the UL transmission are performed shall be known to the terminal device. Therefore, the unlicensed carrier may need to be indicated to the terminal device. For example, the unlicensed carrier may be explicitly indicated by including the information regarding the unlicensed carrier in the indicating information or implicitly indicated as mentioned above for the DL-only case.

In an alternative embodiment, some information that changes slowly or can be predetermined, such as TXOP, may be signalled to the terminal device via higher layer signalling. Therefore, such information may not be included in the indicating information.

In another embodiment that a UL grant for UL scheduling can be successfully received at the terminal device, the UL grant may be used to determine the start of the UL transmission. For example, the UL transmission may be started at a boundary of a subframe after the subframe in which the uplink grant is received at the terminal device. Particularly, if the UL grant is successfully received in subframe 1, then the UL transmission scheduled by this UL grant may start at the boundary of subframe 2, or subframe 3 etc. In this case, information on the start of the UL transmission may not be included in the indicating information.

TABLE 1

| Bits | Indication | Applicable subframe |
|---|---|---|
| 2 or 3 | the relative position of the initial signal | a subframe comprising the initial signal; or a subframe after that subframe |
| 4 | the start of the DL transmission | a subframe in which the DL transmission starts; or a subframe after that subframe |
| 4 | the end of the DL transmission | A subframe in which the DL transmission ends |
| <=4 | the duration of TXOP or the DL transmission | Any |
| N determined by a number of available unlicensed carriers | Unlicensed carrier | A subframe in which the DL transmission starts; or a subframe after that subframe |
| Padding bits | | Any |

For DL+UL Case

Similar to the DL-only case, in order to achieve the ultimate goal of enabling the transmission, i.e. DL and UL transmission to be performed on the unlicensed carrier, any one or more pieces of information from which, alone or in combination, the necessary information for enabling the DL and UL transmission on the unlicensed carrier can be derived, may be indicated to the terminal device as the indicting information.

Again, the indicating information may be signalled in a plurality of bits, e.g. by reusing the existing DCI format 1C as defined in section 5.3.3 in 3GPP Technical Specification 36.212 version 12.4.0. In this case, a new RNTI may be required to differentiate the reused DCI format 1C from the existing use of DCI format 1C.

Alternatively, the indicating information may be signalled with a new DCI format comprising a field that may include the indicating information.

Similar to the DL-only case, a relative start position of the initial signal may also be used to reduce the number of bits for indicating the frame structure.

As an example, Table 2 lists some bits that may possibly be used for indicating the frame structure, alone or in combination, in the reused DCI format 1C, which may provide 15 bits for 20 MHz. In this example, it is assumed that the UL transmission starts from a subframe boundary.

In an embodiment, the indicating information may comprise any or any combination of information in a group of:
- information on the start of uplink transmission,
- information on the end of the uplink transmission,
- information on the duration of a TXOP, and
- information on the duration of the UL transmission.

In a further embodiment that the frame structure in FIG. 2(C) is adopted and an initial signal is transmitted in the first

TABLE 2

| Bits | Indication | Applicable subframe |
|---|---|---|
| 2 or 3 | the relative position of the initial signal | a subframe comprising the initial signal; or a subframe after that subframe |
| 4 | the start of the DL transmission | a subframe in which the DL transmission starts; or a subframe after that subframe |
| 4 | the end of the DL transmission | a subframe in which the DL transmission ends |
| <=4 | the duration of TXOP or the DL + UL transmission | any |
| 4 | the end position of the UL transmission in a subframe in which the UL transmission ends | a subframe in which the UL transmission ends |
| <=4 | the subframe in which the UL transmission ends | the subframe in which the UL transmission ends |
| N determined by a number of available unlicensed carriers | Unlicensed carrier | A subframe in which the DL transmission starts; or a subframe after that subframe |
| Padding bits | | Any |

As another example, Table 3 lists some bits that may possibly be used for indicating the frame structure, alone or in combination, in the reused DCI format 1C, which may provide 15 bits for 20 MHz. In this example, it is assumed that the UL transmission starts from a symbol boundary.

group of time resources, the above group may further comprise information on a start of the first group of time resources or on a start of the initial signal.

In another embodiment that a UL grant for UL scheduling can be successfully received by the terminal device, the UL

TABLE 3

| Bits | Indication | Applicable subframe |
|---|---|---|
| 2 or 3 | the relative position of the initial signal | a subframe comprising the initial signal; or a subframe after that subframe |
| 4 | the start of the DL transmission | a subframe in which the DL transmission starts; or a subframe after that subframe |
| 4 | the end of the DL transmission | a subframe in which the DL transmission ends |
| 4 | the start position of the UL transmission in a subframe in which the UL transmission starts | a subframe in which the UL transmission starts |
| <=4 | the subframe in which the UL transmission starts | the subframe in which the UL transmission starts |
| 4 | the end position of the UL transmission in a subframe in which the UL transmission ends | a subframe in which the UL transmission ends |
| <=4 | the subframe in which the UL transmission ends | the subframe in which the UL transmission ends |
| <=4 | the duration of TXOP or the DL + UL transmission | any |
| N determined by a number of available unlicensed carriers | Unlicensed carrier | A subframe in which the DL transmission starts; or a subframe after that subframe |
| Padding bits | | Any |

For UL-Only Case

Similar to the DL-only or DL+UL case, in order to achieve the ultimate goal of enabling the transmission, i.e. UL transmission to be performed on the unlicensed carrier, any one or more pieces of information from which, alone or in combination, the necessary information for enabling the UL transmission on the unlicensed carrier can be derived, may be indicated to the base station as the indicting information.

grant may be used to determine the start of the UL transmission. Therefore, information on the start of the UL transmission may not be included in the indicating information.

The indicating information may be signalled periodically or aperiodiacally in a plurality of bits, for example on PUCCH.

Similar to the DL-only or DL+UL case, a relative start position of the initial signal may also be used to reduce the number of bits for indicating the frame structure.

As an example, Table 4 lists some bits that may possibly be used for indicating the frame structure, alone or in combination.

TABLE 4

| Bits | Indication | Applicable subframe |
|---|---|---|
| 2 or 3 | the relative position of the initial signal | a subframe comprising the initial signal; or a subframe after that subframe |
| 4 | the start of the UL transmission | a subframe in which the UL transmission starts; or a subframe after that subframe |
| <=4 | the duration of TXOP or the UL transmission | any |
| 4 | the end of the UL transmission | a subframe in which the UL transmission ends |
| Padding bits | | Any |

Now reference is made back to FIG. 4. Optionally, the method 400 may also comprise determining availability of the unlicensed carrier in the unlicensed spectrum at step 401 and reserving a time period on the unlicensed carrier upon the unlicensed carrier is determined to be available at step 402. The reserved time period may be the same as the reservation period mentioned above.

According to the above various embodiments, there is provided a feasible method 400 for indicating a frame structure applicable for transmission over the unlicensed spectrum between communicating parties, so that the transmission can be performed over the unlicensed spectrum according to that frame structure.

Figure 6:
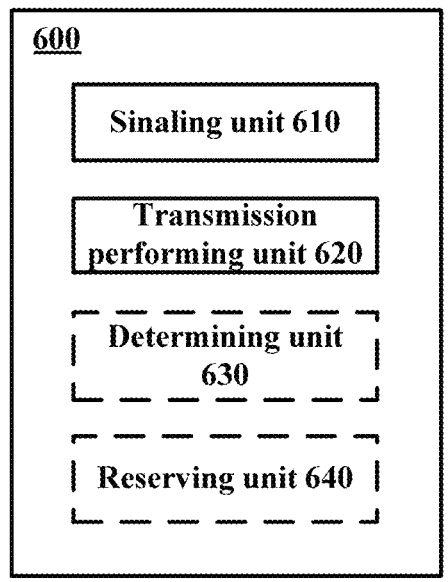
FIG. 6 illustrates a schematic block diagram of an apparatus for performing transmission according to a frame structure over an unlicensed spectrum in accordance with embodiments of the present disclosure.

FIG. 6 illustrates a schematic block diagram of an apparatus 600 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum. The apparatus 600 may be embodied at or as at least a part of the base station or the terminal device.

Particularly, the apparatus 600 comprises a signaling unit 610 and a transmission performing unit 620.

The signalling unit 610 is configured to signal information indicating the frame structure. The transmission performing unit 620 is configured to perform transmission between the base station and the terminal device on an unlicensed carrier in the unlicensed spectrum according to the frame structure.

In an embodiment, the signaling unit 610 may be configured to signal the information indicating the frame structure on a licensed carrier in the licensed spectrum.

In an alternative embodiment, the signaling unit 610 may be configured to signal the information indicating the frame structure on the unlicensed carrier.

In another embodiment, the information indicating the frame structure may comprise any or any combination of information in a group of:
information on a start of downlink transmission,
information on an end of the downlink transmission,
information on a duration of an allowed maximum transmission time period,
information on the duration of the downlink transmission, and
information regarding the unlicensed carrier.

In a further embodiment, the group may also comprise any or any combination of:
information on a start of uplink transmission,
information on an end of the uplink transmission,
information on the duration of the uplink transmission, and
information on a sum of the durations of the downlink transmission and the uplink transmission.

In yet another embodiment, the UL transmission may be started at a boundary of a subframe after the subframe in which an uplink grant is received at the terminal device. Thus, information on the start of the UL transmission may not be included in the information indicating the frame structure.

In yet another embodiment, the signaling unit 610 may be configured to signal the information indicating the frame structure by reusing the DCI format 1C.

In yet another embodiment, the signaling unit 610 may be configured to signal the information indicating the frame structure by using a new DCI format that comprises a field including the information indicating the frame structure.

In an alternative embodiment, the information indicating the frame structure may comprise any or any combination of information in a group of:
information on a start of uplink transmission,
information on an end of the uplink transmission,
information on a duration of the uplink transmission, and
information on the duration of an allowed maximum transmission time period.

In another embodiment, the method may further comprise a determining unit 630 that is configured to determine availability of the unlicensed carrier in the unlicensed spectrum and a reserving unit 640 that is configured to reserve a time period on the unlicensed carrier upon the unlicensed carrier is determined to be available. In this embodiment, the group as mentioned in above embodiments may further comprise information on a start of the reserved time period and/or an end of the reserved time period.

The above units 610-640 may be configured to implement the corresponding operations or steps as described with reference to FIGS. 4-6. All features with regard to the frame structure indication described above in relation to method 400 are equally applicable to the apparatus 600 and thus will not be detailed herein for the sake of brevity.

Figure 7:
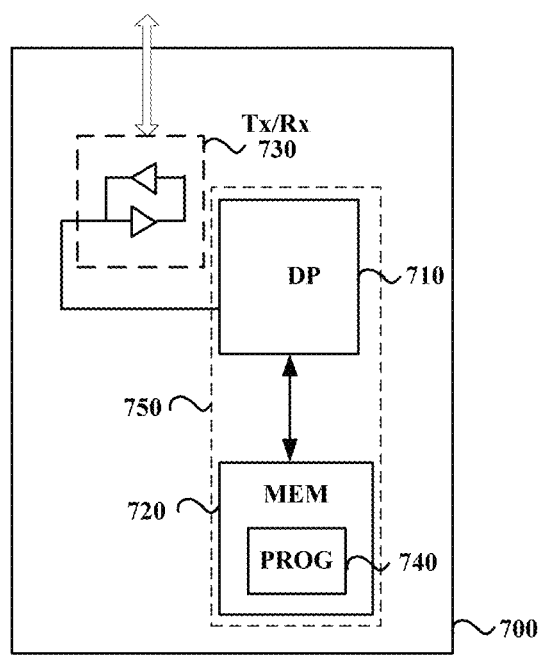
FIG. 7 illustrates a schematic block diagram of another apparatus for performing transmission according to a frame structure over an unlicensed spectrum in accordance with embodiments of the present disclosure.

FIG. 7 illustrates a schematic block diagram of an apparatus 700 for performing transmission between a base station and a terminal device according to a frame structure over an unlicensed spectrum in a wireless network in accordance with embodiments of the present disclosure. The wireless network supports communications over both a licensed spectrum and the unlicensed spectrum, which means the base station and the terminal device are operable in both the licensed spectrum and the unlicensed spectrum. The apparatus 700 may be embodied at or as at least part of the base station or the terminal device.

In FIG. 7, units in blocks with a solid line are essential while units in blocks with a broken line are optional depending on various implementations of the present disclosure.

The apparatus 700 comprises at least one processor 710, such as a data processor (DP) and at least one memory (MEM) 720 coupled to the processor 710. The apparatus 700 may further comprise a transmitter TX and receiver RX 730 coupled to the processor 710 for establishing wireless communications with other apparatuses. The MEM 720 stores a program (PROG) 740. A combination of the at least one processor 710 and the at least one MEM 720 may form processing means 750 adapted to implement some embodiments of the present disclosure.

The PROG 740 may include instructions that, when executed on the associated processor 710, enable the apparatus 700 to operate in accordance with the embodiments of the present disclosure, for example to perform the method 400 as described with reference to FIG. 4. Alternatively, the processing means 750 may be adapted to implement some embodiments of the present disclosure as described with reference to FIG. 4.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 710 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a base station, the method comprising:
   transmitting first information to a user equipment (UE);
   determining second information,
   wherein the first information indicates a start position and a duration of a Physical Uplink Control Channel (PUCCH) transmission, and the second information indicates a time duration of an uplink transmission that is performed based on a channel access procedure, wherein the time duration starts after a first channel is sensed to be idle and after a reserved time duration, and wherein the time duration is a duration of time that precedes the start position of the PUCCH transmission; and
   receiving the PUCCH transmission and the uplink transmission on the first channel.

2. The method according to claim 1, wherein the first information indicates the start position in terms of a symbol in time domain.

3. The method according to claim 1, further comprising transmitting third information indicating first n symbols in a subframe occupied by a downlink transmission, wherein other symbols in the subframe are not occupied.

4. The method according to claim 3, wherein the third information is transmitted by using a downlink control information (DCI) format.

5. A base station comprising:
   a transceiver configured to:
   transmit first information to a user equipment (UE);
   determine second information,
   wherein the first information indicates a start position and a duration of a Physical Uplink Control Channel (PUCCH) transmission, and the second information indicates a time duration of an uplink transmission that is performed based on a channel access procedure, wherein the time duration starts after a first channel is sensed to be idle and after a reserved time duration, and wherein the time duration is a duration of time that precedes the start position of the PUCCH transmission; and
   receive the PUCCH transmission and the uplink transmission on the first channel.

6. The base station according to claim 5, wherein the first information indicates the start position in terms of a symbol in time domain.

7. The base station according to claim 5, wherein the transceiver is further configured to transmit third information indicating first n symbols in a subframe occupied by a downlink transmission, wherein other symbols in the subframe are not occupied.

8. A method performed by a user equipment (UE), the method comprising:
- receiving first information from a base station;
- determining second information,
- wherein the first information indicates a start position and a duration of a Physical Uplink Control Channel (PUCCH) transmission, and the second information indicates a time duration of an uplink transmission that is performed based on a channel access procedure, wherein the time duration starts after a first channel is sensed to be idle and after a reserved time duration, and wherein the time duration is a duration of time that precedes the start position of the PUCCH transmission; and
- performing the PUCCH transmission and the uplink transmission on the first channel.

9. The method according to claim 8, wherein the first information indicates the start position in terms of a symbol in time domain.

10. The method according to claim 8, further comprising receiving third information indicating first n symbols in a subframe occupied by a downlink transmission, wherein other symbols in the subframe are not occupied.

* * * * *